United States Patent [19]
Sato et al.

[11] Patent Number: 5,174,598
[45] Date of Patent: Dec. 29, 1992

[54] ACTIVE SUSPENSION SYSTEM

[75] Inventors: Masaharu Sato; Naoto Fukushima; Yosuke Akatsu; Itaru Fujimura; Kensuke Fukuyama, all of Kanagawa, Japan

[73] Assignee: Nissan Motor Co., Ltd., Japan

[21] Appl. No.: 798,089

[22] Filed: Nov. 27, 1991

[30] Foreign Application Priority Data

Nov. 30, 1990 [JP] Japan .................. 2-334151

[51] Int. Cl.$^5$ ............................................ B60G 17/00
[52] U.S. Cl. .................... 280/707; 180/41; 364/424.05
[58] Field of Search ............... 280/840, 707, DIG. 1; 364/424.05; 180/41

[56] References Cited
U.S. PATENT DOCUMENTS

| 4,154,461 | 5/1979 | Schnittger. |
| 4,905,152 | 2/1990 | Kawabata ............................ 280/707 |
| 4,907,154 | 3/1990 | Yasuda et al. .................. 364/424.05 |
| 4,954,957 | 9/1990 | Kawagoe et al. ............. 364/424.05 |
| 5,013,067 | 5/1991 | Mine et al. ............................ 280/840 |

FOREIGN PATENT DOCUMENTS

1-116813 8/1989 Japan.

Primary Examiner—Kenneth R. Rice
Attorney, Agent, or Firm—Lowe, Price, LeBlanc & Becker

[57] ABSTRACT

An active suspension system for an automotive vehicle is arranged to regulate the attitude of a vehicle body in a flat or balanced state by controlling hydraulic cylinders respectively disposed between a vehicle body and a road wheel, in response to an attitude change of the vehicle body. The active suspension system comprises electromagnetically operated variable vibration attenuation valves, each of which is fluidly connected with each hydraulic cylinder and is followed by an accumulator. Each variable vibration attenuation valve is adapted to be variable in its attenuation constant in response to a vertical acceleration experienced by the road wheel. The variable vibration attenuation valve takes on a low attenuation constant to maintain a high riding quality of the vehicle under a normal cruising condition, and a high attenuation constant to suppress the response of the road wheel under a rough road cruising condition.

10 Claims, 9 Drawing Sheets

ACTIVE SUSPENSION SYSTEM

BACKGROUND OF THE INVENTION

1. Field of the Invention

This invention relates to improvements in an active suspension system for controlling an vehicle body attitude in response to a change in vehicle body attitude thereby to maintain the vehicle body in a flat or horizontal state, and more particularly to a device provided in the suspension system, for controlling the damping force of each of the fluid-operated cylinders forming part of the suspension system in accordance with a vehicle cruising condition.

2. Description of the Prior Art

Active suspension systems for automotive vehicles have been proposed and many are now put into practical use. One of them is disclosed in Japanese Utility Model Provisional Publication No. 1-116813, and is arranged to have a hydraulic cylinder disposed between a vehicle body and each road wheel. The pressure of a hydraulic fluid to be supplied to the hydraulic cylinder is controlled by a pressure control valve. The pressure control valve is in turn controlled by a vehicle attitude control device in a manner such to suppress an attitude change of the vehicle body. A flow restrictor is provided between the pressure control valve and the hydraulic cylinder to restrict the flow of the hydraulic fluid. Additionally, the pressure chamber of the hydraulic cylinder is connected through a vibration attenuation or damping valve to an accumulator.

The flow restrictor between the pressure control valve and the hydraulic cylinder functions to damp vibration having frequencies within a resonance frequency region of a sprung mass (vehicle body) of the vehicle, the vibration being applied from a road surface to the vehicle body. The accumulator and the attenuation valve directly connected with the hydraulic cylinder pressure chamber function to damp out and absorb vibration having frequencies within a resonance frequency region of the unsprung mass (road wheel) of the vehicle.

However, difficulties have been encountered in the above; discussed conventional active suspension system as follows. The respective attenuation constants of the above-mentioned flow restrictor and the above-mentioned attenuation valve are set at constant or fixed values. Accordingly, if the attenuation constant of the attenuation valve directly connected with the hydraulic cylinder is set relatively high, in order to sufficiently damp an vibration input at the frequencies within the unsprung mass resonance frequency region, the vibration transmission force in a high frequency range near the unsprung mass resonance frequency region is increased. This adversely affects the riding quality or occupant comfort of the vehicle. In contrast, if the flow restrictor between the pressure control valve and the hydraulic pressure is set to have a relatively high attenuation constant, in order to sufficiently damp the vibration input at the frequencies within the sprung mass resonance frequency region, the vibration transmission force on the higher frequency side than the sprung mass resonance frequency region thereby also adversely affects the riding quality or comfort of the vehicle.

SUMMARY OF THE INVENTION

An object of the present invention is to provide an improved active suspension system for a vehicle, which overcomes the drawbacks encountered in conventional active suspension systems.

Another object of the present invention is to provide an improved active suspension system for a vehicle, which can sufficiently damp out vibrations of sprung or unsprung mass of both the vehicle while providing a high riding quality or occupant comfort of the vehicle.

A further object of the present invention is to provide an improved positive suspension system for a vehicle, in which the damping force of a fluid-operated suspension cylinder is variable in accordance with a vertical acceleration of a member (connected with each suspension cylinder) of the vehicle.

The active suspension system according to the preferred embodiment of the present invention is suitable for a vehicle, and comprises a fluid-operated cylinder disposed between and connecting a vehicle body side and a road wheel side member. An operating fluid to be supplied to the fluid-operated cylinder is controlled in accordance with a first command value. A vehicle attitude change sensor is provided to detect a change in the attitude of the body of the vehicle to generate an attitude change detection signal representative of the change. The first command value is calculated in accordance with the detected attitude change value by a first command value calculating device. The positive suspension system further comprises a vertical acceleration sensor for detecting a vertical acceleration of a movable member functionally connected to the fluid-operated cylinder to generate a vertical acceleration value representative of the vertical acceleration. The movable member is vertically movable during cruising of the vehicle. A damping force changing device is provided to change a damping force of the fluid-operated cylinder in accordance with a second command value. The second command value is calculated in response to the vertical acceleration detection value by a second command value calculating device.

Accordingly, by virtue of the fact that the vibration damping force of the fluid-operated cylinder is changed in accordance with the vertical acceleration of the movable member functionally connected to the cylinder, the damping force of the fluid-operated cylinder can be controlled at a relatively low value to maintain a high riding quality or occupant comfort during a normal cruising condition, while it can be controlled at a relatively high value to suppress a large vertical movement of a road wheel or a vehicle body during rough road cruising of the vehicle. Thus, the damping force of the fluid-operated cylinder is controlled in accordance with a vehicle cruising condition, so that sufficient vibration suppression is exhibited during excitation input while maintaining a high riding quality or occupant comfort under a normal vehicle cruising condition.

BRIEF DESCRIPTION OF THE DRAWINGS

In the drawings, like reference numerals designate like elements and parts throughout all figures, in which.

DETAILED DESCRIPTION OF THE INVENTION

Figure 1:
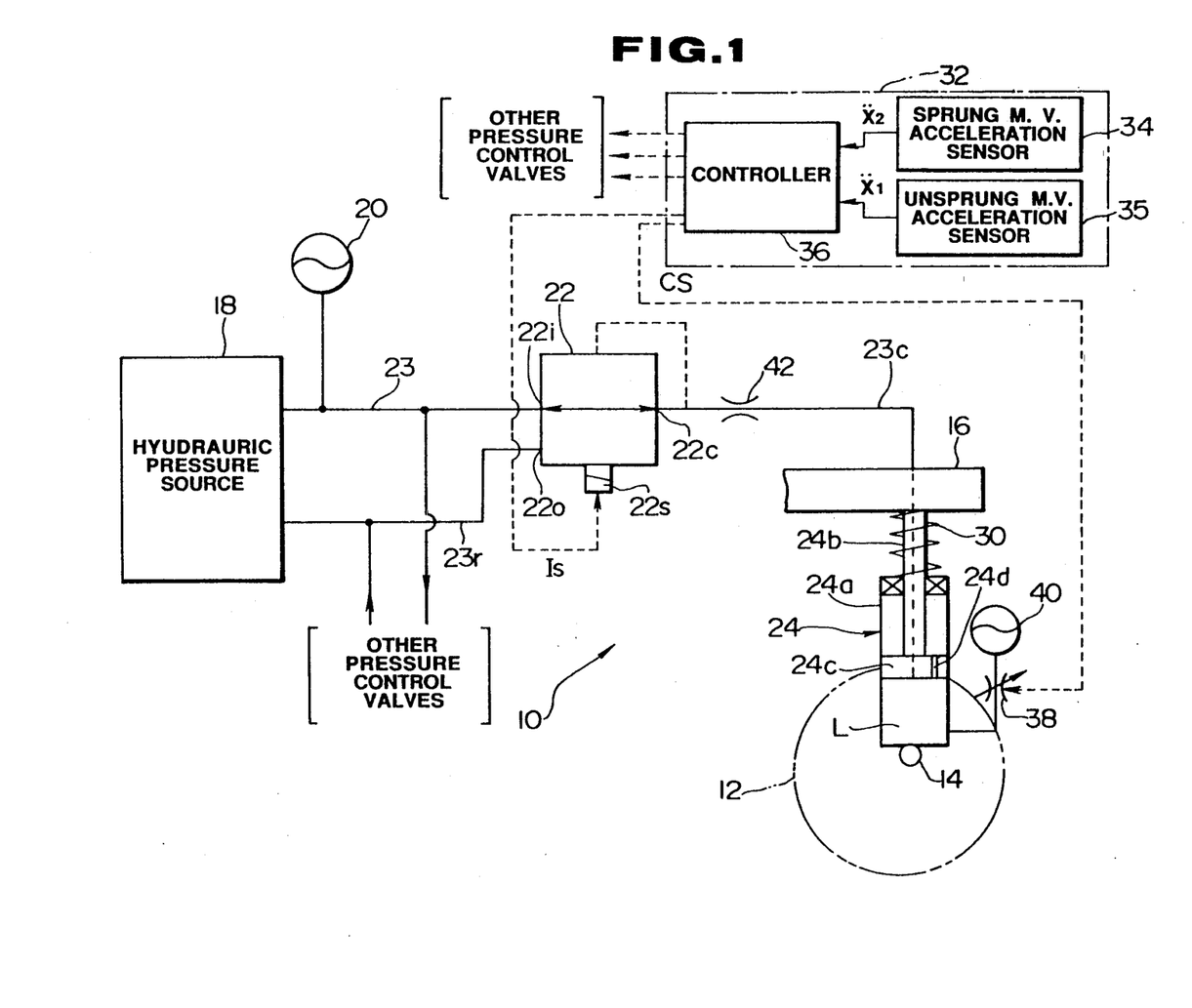
FIG. 1 is a schematic illustration of a preferred embodiment of an active suspension system according to the present invention.

FIG. 1 of the drawings shows an embodiment of an active suspension system 10 according to the present invention. The active suspension system 10 is suitable for supporting an automotive vehicle (not shown) and is therefore to be mounted on a vehicle body (not shown) of the automotive vehicle (not shown). The active suspension system 10 comprises of a hydraulic (oil) pressure source 18 which is adapted to supply a hydraulic fluid (oil) at a predetermined line pressure. An accumulator 20 is fluidly connected to and located downstream of the hydraulic pressure source 18. An pressure control valve 22 is fluidly connected to and located downstream of the accumulator 20. A hydraulic cylinder 24 is fluidly connected to and located downstream of the pressure control valve 22, and interposed between a vehicle body side member 16 and a road wheel side member 14. The vehicle body side member 16 forms part of the vehicle body, while the wheel side member 14 is fixedly connected to a movable member (not shown) such as a knuckle relative to which a road wheel 12 is rotatably mounted.

Although only one hydraulic system including the hydraulic cylinder 24 and the pressure control valve 22 is shown and described, it will be understood that four such hydraulic systems are typically employed respectively for four road wheels 12 (not shown). Accordingly, a discussion is provided on only one active suspension system 10 including the hydraulic system for the purpose of simplicity of illustration.

The hydraulic pressure source 18 includes an hydraulic (oil) pump (not shown) which is adapted to be driven by an engine (not shown) of the vehicle and to pressurize hydraulic fluid in a tank (not shown), to thereby discharge hydraulic fluid (oil) under pressure. The discharged hydraulic fluid provides a predetermined line pressure in the hydraulic system of the active suspension system.

The pressure control valve 22 has input, return and controlled pressure ports $22i$, $22o$, $22c$. The input port $22i$ is in fluid communication with the discharge side of the hydraulic pressure source 18 through a line pressure pipe 23. The return port $22o$ is in fluid communication with the return side of the hydraulic pressure source 18 through a return side pipe $23r$. The controlled pressure port $22c$ is in fluid communication with a pressure chamber L of the hydraulic cylinder 24 through a pipe $23c$. The inlet port $22i$ is adapted such that the hydraulic pressure from the hydraulic pressure source 18 is introduced therethrough into the control valve 22. The return port $22o$ is adapted such that the hydraulic pressure in the pressure control valve 22 is returned to the hydraulic pressure source 18. The controlled pressure port $22c$ is adapted such that the hydraulic pressure controlled in the pressure control valve 22 is supplied therethrough to the hydraulic cylinder 24. Additionally, the pressure control valve 22 includes a spool (not shown) which is adapted to change a communication state among the ports $22i$, $22o$, $22c$ in a manner that: (1) the communication between the controlled pressure port $22c$ and the input port $22i$ and the communication between the controlled pressure port $22c$ and the return port $22o$ are blocked; and (2) either one of the communication between the controlled pressure port $22c$ and the input port $22i$ and the communication between the controlled pressure port $22c$ and the return port $22o$ is established.

More specifically, an input pressure from the hydraulic pressure source 18 is applied as a pilot pressure to one end face of the spool, whereas a controlled hydraulic pressure at the controlled pressure port $22c$ is applied as another pilot pressure to the other end face of the spool. The input pressure (pilot pressure) is controlled by a poppet valve (not shown) which is controlled by a proportional solenoid $22s$. Thus, the fluid pressure at the controlled pressure port $22c$ is always controlled in accordance with an excitation (energization) current Is supplied to the proportional solenoid $22s$ from a control unit 32 which will be discussed after. The fluid pressure at the controlled pressure port $22c$ is hereinafter referred to as a "controlled hydraulic pressure Pc".

Figure 2:
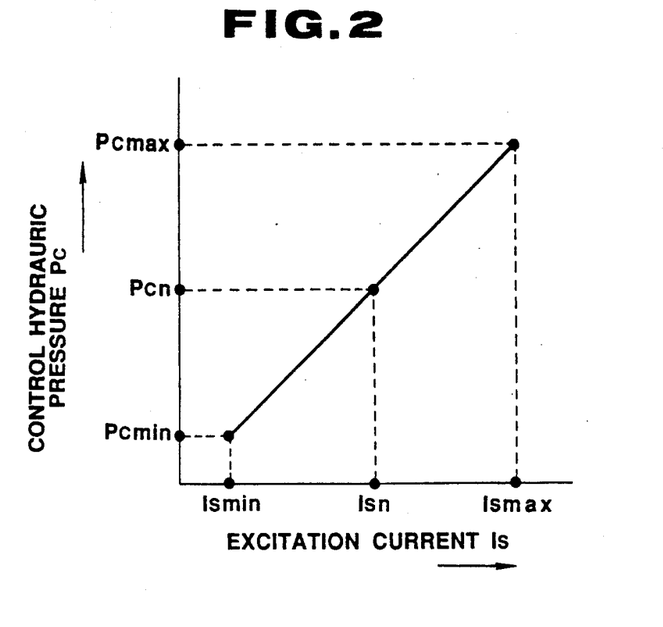
FIG. 2 is a graph showing the relationship between an excitation current and a controlled hydraulic pressure, in connection with a pressure control valve used in the system of FIG. 1.

The relationship between the excitation current Is and the controlled hydraulic pressure Pc is shown in FIG. 2. As shown, when the excitation current Is is at a smaller value Ismin near zero, the controlled hydraulic pressure Pc takes a lower value Pcmin. From this state, when the excitation current Is increases in a positive direction, the controlled hydraulic pressure Pc increases with a predetermined proportional gain K1 and finally takes the maximum value Pcmax which corresponds to a preset line pressure in the hydraulic system.

Assuming that a vibration excitation input at a resonance frequency region of a sprung mass or members (vehicle body) of the vehicle is made from a road surface, a hydraulic pressure variation due to the excitation input is transmitted through the hydraulic cylinder 24 to the controlled pressure port $22c$ of the pressure control valve 22. At this time, the controlled and input pressures applied to the opposite end faces of the above-mentioned spool of the pressure control valve 22 becomes unbalanced. Accordingly, the spool makes its slight axial movements to thereby attenuate and absorb the vibration excitation input. It will be understood that the sprung mass (vehicle body) makes its resonance vibration upon being supplied with vibrations having frequencies within its resonance frequency region.

As illustrated in FIG. 1, the hydraulic cylinder 24 includes a cylinder tube 24a fixedly attached to the wheel side member (such as the knuckle) 14. A piston 24c is slidably disposed in the cylinder tube 24a to separate the pressure chamber L into upper and lower chambers (not identified) which are in communication with each other through a communication hole 24d formed through the piston 24c. A piston rod 24b is fixedly connected at its lower end to the piston 24c and at its upper end with the vehicle body side member 16. The pressure chamber L is in fluid communication with the controlled pressure port 22c through the pipe 23c, so that the hydraulic pressure within the pressure chamber L is controlled by the pressure control valve 22. Accordingly, the hydraulic cylinder 24 develops an extending force in accordance with an area difference between the pressure receiving areas at the upper and lower chambers of the pressure chamber L. A coil spring 30 is disposed between the vehicle body side member 16 and the cylinder tube 24a of the hydraulic cylinder 24 to support a static load of the vehicle body.

Additionally, the pressure chamber L is in fluid communication with an accumulator 40 through an electromagnetically operated variable attenuation valve 38 which serves as a damping force changing mechanism. The variable attenuation valve 38 in cooperation with the accumulator 40 functions to attenuate and absorb vibrations (from the road surface) at a resonance frequency region of the unsprung mass (road wheel) of the vehicle. It will be understood that the unsprung mass (members) makes its resonance vibration upon being supplied with the vibrations having the frequencies within its resonance frequency region. The pipe 23c is provided with a fixed flow restrictor e.g., an orifice 42 whose flow passage or cross-sectional area is not variable. The fixed flow restrictor 42 is disposed in the pipe 23c between the controlled pressure port 22c of the pressure control valve 22 and the pressure chamber L of the hydraulic cylinder 24.

The control unit 32 is provided to control the pressure control valve 22 and the electromagnetically operated variable attenuation valve 38, and includes a sprung mass vertical acceleration sensor 34 and an unsprung mass vertical acceleration sensor 35. The sprung mass vertical acceleration sensor 34 is adapted to detect a vertical acceleration of the vehicle body at a position corresponding to or near each road wheel 12. The unsprung mass vertical acceleration sensor 35 is adapted to detect a vertical acceleration of the load wheel 12 and therefore attached, for example, to the cylinder tube 24a of the hydraulic cylinder 24. The vertical acceleration sensors 34, 35 are respectively adapted to provide output detection signals at vertical acceleration detection values $\ddot{X}2$ and $\ddot{X}1$. The acceleration detection signals from acceleration sensors 34, 35 are supplied to a controller 36 which is adapted to generate control signals in response to the acceleration detection signals and to output them to the proportional solenoid 22s of the pressure control valve 22 and the electromagnetically operated variable attenuation valve 38. Each of the detection values $\ddot{X}2$ and $\ddot{X}1$ corresponds to a zero voltage when no vertical acceleration is detected by the sensor 34, 35, while positive or negative voltage valves are generated when upward or downward acceleration is detected by the sensor 34, 35. The output acceleration detection values $\ddot{X}2$, $\ddot{X}1$ there obtained are input to the controller 36.

The controller 36 includes a microcomputer and is arranged to execute the process of a vehicle body attitude control per FIG. 3 (as discussed below) and the process of a damping force control of per FIG. 4 (as discussed below).

Figure 3:
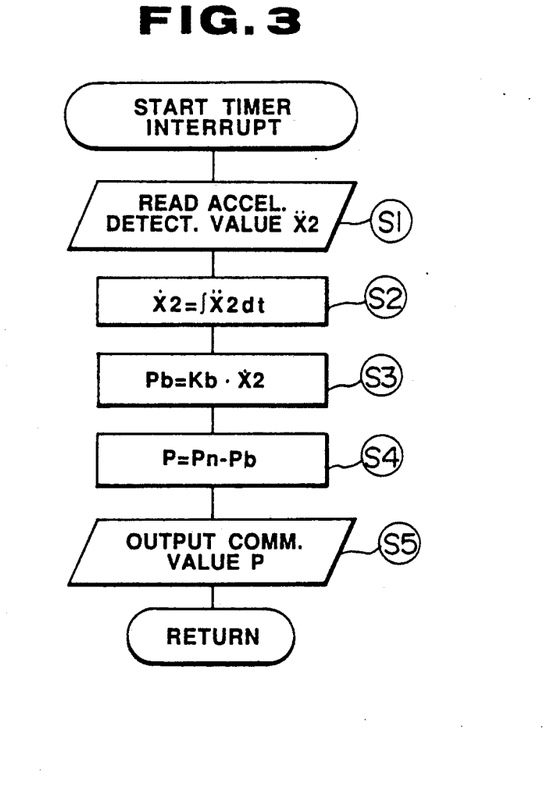
FIG. 3 is a flowchart showing the process of an exemplary vehicle body attitude control, executed by a controller used in the system of FIG. 1.

The process of the vehicle body attitude control (or a bounce suppression control) in FIG. 3 achieves suppression of upward and downward movements of the vehicle body in accordance with the vertical acceleration detection value $\ddot{X}2$ of the sprung mass vertical acceleration sensor 34, and is executed repeatedly at predetermined time intervals (for example, 20 msec) by timer interrupt handling. As shown in the flowchart of FIG. 3, at a step S1, the vertical acceleration detection value $\ddot{X}2$ of the sprung mass vertical acceleration sensor 34 is read. Then, the computation moves to a second step S2 at which the vertical acceleration detection value $\ddot{X}2$ is integrated to obtain a vertical velocity detection value $\dot{X}2$. The processing then moves to a step S3 at which the vertical velocity detection value $\dot{X}2$ is multiplied by a predetermined bounce control gain Kb, to thereby to obtain a bounce suppression pressure command value Pb. Thereafter, at step S4 a pressure command value P is calculated by subtracting the bounce suppression pressure command value Pb from a neutral pressure command value Pn which is required to maintain the vehicle body, in a predetermined standard loading state, at a target vehicle height (the height of the vehicle body from the ground). Finally, at a step S5 the pressure command value P is converted to an analog current value and output as the excitation current Is to the proportional solenoid 22s of the pressure control valve 22.

Figure 4:
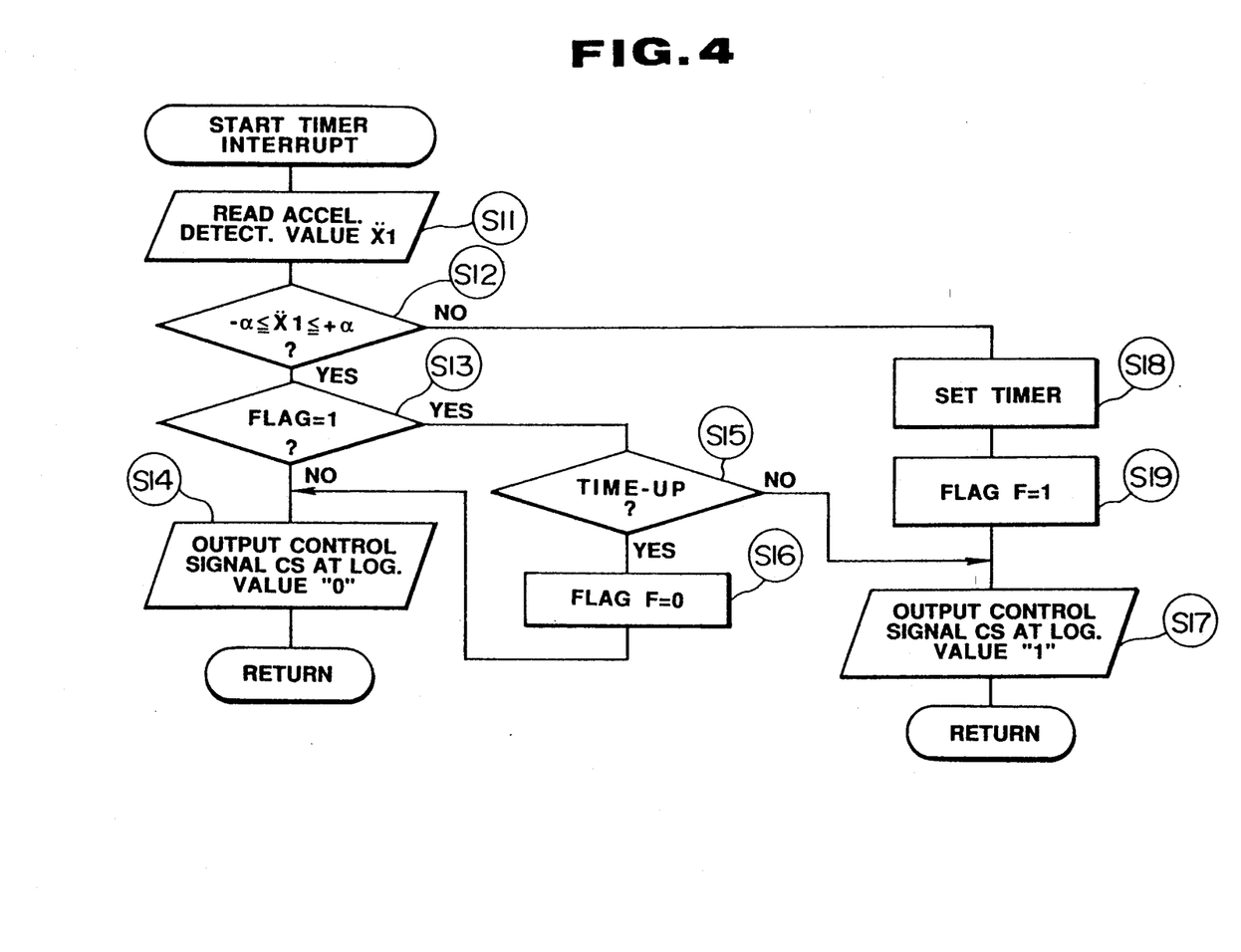
FIG. 4 is a flowchart showing the process of an exemplary damping force control, executed by the controller used in the system of FIG. 1.

The process of the damping force control in FIG. 4 is also executed repeatedly at predetermined time intervals (for example, 20 msec) by a timer interrupt handling like the process per FIG. 3. As shown in FIG. 4, at a step S11, the vertical acceleration detection value $\ddot{X}1$ of the unsprung vertical acceleration sensor 35 is read. At a step S12 a judgment is made as to whether the vertical acceleration detection value $\ddot{X}i$ is within an allowable range between a predetermined upper limit threshold value $+\alpha$ and a predetermined lower limit threshold value $-\alpha$. This judgment indicates whether the vertical acceleration of the wheel side member 14 is such so large as to harm the wheel side member 14. In case of $-\alpha < \ddot{X}1 < +\alpha$, the effect on the unsprung mass (members) is judged as being small, and therefore the process goes to a step 13 at which a judgment is made as to whether a flag F is set at "1" or not. When the flag is set at "0", at a step S14 a control signal CS at a logical value "1" is output, and then the timer interrupt handling is terminated so that the operation is returned to a predetermined main program of the control unit 32. It will be understood that the control signal CS is supplied to the electromagnetically operated variable attenuation valve 38 upon being converted to an analog current value. The control signal CS at the logical value "1" provides a control such that the electromagnetically operated variable attenuation valve 38 takes a low attenuation constant (coefficient), i.e., the cross sectional area of the restrictor orifice of the valve is increased.

When the judgment result at the step S13 is such that the flag F is set at "1", the process goes to a step S15 at which a judgment is made as to whether a timer makes its time-up operation or not. In case that the time-up operation is made in the timer, the flag F is reset to "0" at a step S16, and then the process moves to step S14. If no time-up operation is made in the timer, the process goes to a step 17 at which the control signal CS at a logical value "0" is output, and then the timer interrupt handling is terminated so that the operation is returned to the predetermined main program. The control signal CS at the logical value "0" provides a control such that the electromagnetically operated variable attenuation valve 38 takes on a high attenuation constant, i.e., the restrictor orifice cross sectional area of the variable attenuation valve 38 is decreased.

Furthermore, in case that the judgment result at the step S12 is $\ddot{X}1 < -\alpha$ or $\ddot{X}1 > +\alpha$, the effect on the unsprung mass (members) is judged as being large. Therefore, the process goes to a step 18 at which the timer is set, and then goes to a step S19 at which the flag is set at "1". Thereafter, at the above-mentioned step S17 at the electromagnetically operated variable attenuation valve 38 is set to take the high attenuation constant.

The manner of operation of the active suspension system of this embodiment will be discussed hereinafter.

Assuming that the vehicle is now in a stopping condition in which there is no getting on and off by a passenger and no loading and unloading operations no vertical movement occurs in the wheel side member 14 and in the vehicle body side member 16, so that the vertical acceleration detection value $\ddot{X}2$ of the sprung vertical acceleration sensor 34 is zero while the vertical acceleration detection value $\ddot{X}1$ of the vertical acceleration sensor 34 also zero. Accordingly, when the timer interrupt handling of the vehicle body attitude control in FIG. 3 is executed, the vertical velocity detection value $\dot{X}2$ calculated at the step S2 becomes zero, and therefore the bounce suppression pressure command value Pb becomes zero. As a result, the pressure command value P becomes the neutral pressure command value Pn. This pressure command value Pn is converted to the excitation current Is having a neutral value Isn indicated in FIG. 2 and output to the proportional solenoid 22s of the pressure control valve 22. Consequently, the controlled hydraulic pressure Pc takes on a neutral value Pcn indicated in FIG. 2, thereby to maintain the vehicle body in a flat or horizontal state.

When the process of the damping force control in FIG. 4 is executed, the computation process goes from the step S12 to the step S13 at which the flag F is reset at "0" since the vertical acceleration detection value $\ddot{X}1$ of the wheel side member 14 is about zero. Therefore, the process goes to the step S14 to output the control signal CS at the logical value "0" to the electromagnetically operated variable attenuation valve 38. As a result, the electromagnetically operated variable attenuation valve 38 is set at the state of the low attenuation constant.

Figure 5A:
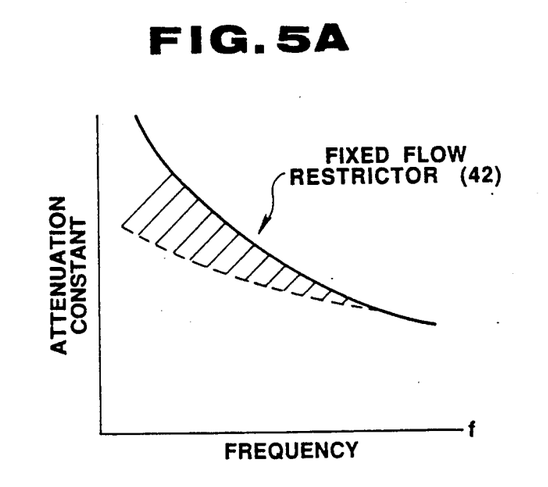
FIG. 5A is a graph showing the relationship between an attenuation constant and a vibration frequency to be damped, in a fixed flow restrictor used in the system of FIG. 1.
Figure 5B:
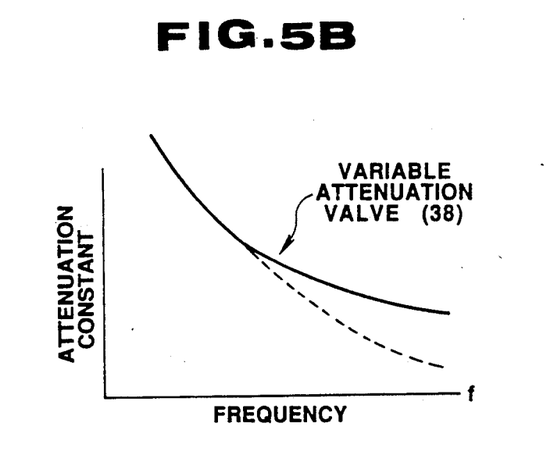
FIG. 5B is a graph showing the relationship between an attenuation constant and a vibration frequency to be damped, in an electromagnetically operated variable attenuation valve used in the system of FIG. 1.

Thereafter, when the vehicle comes into its cruising condition, the hydraulic fluid within the pressure chamber L of the hydraulic cylinder 24 returns to the hydraulic pressure source 18 via the fixed flow restrictor 42 and the pressure control valve 22 if a vibration input from the road surface is within a relatively low frequency range (for example, around 1 Hz), while the same hydraulic fluid is absorbed to the accumulator 40 through the electromagnetically operated variable attenuation valve 38 if the vibration input is at a relatively high frequency range (for example, around 10 Hz). Thus, the vibration attenuation effect in connection with the hydraulic cylinder 24 is approximately allotted to the fixed restrictor 42 and the electromagnetically operated variable attenuation valve 38 in accordance with the frequency of vibration applied to the hydraulic cylinder 24, as shown in FIGS. 5A and 5B. More specifically, within the relatively low frequency range (of the vibration input) corresponding to the sprung mass resonance frequency region, a vibration attenuation effect can be changed within a hatched range in FIG. 5A by changing the flow passage area of the fixed flow restrictor 42 so as to change the attenuation constant of the fixed flow restrictor 42. It will be understood that such changes may be made by replacing the orifice used in the fixed flow restrictor 42. Within the relatively high frequency range (of the vibration input) corresponding to the unsprung mass resonance frequency region, the vibration attenuation effect can be freely changed within a range between solid and broken curves in FIG. 5B by varying the attenuation constant of the electromagnetically operated variable attenuation valve 38.

Now, when the vehicle cruises straight on a flat and good road, the vehicle body makes very little upward and downward movements, and therefore the controlled hydraulic pressure Pc output from the pressure control valve 24 is set at the neutral value Pcn while the electromagnetically operated variable attenuation valve 38 is set to take the low attenuation constant, the same as in the above-discussed vehicle stopping state. As a result, when the loading weight of the vehicle is at the above-mentioned predetermined standard loading state, the vehicle body is maintained in the flat state. Additionally, when slight upward and downward movements of the wheel side member 14 are produced, for example, during vehicle cruising on a road having parting or joining lines extending perpendicularly to the length of the road, they are first transmitted to the hydraulic cylinder 24 to develop a pressure variation in the pressure chamber L of the hydraulic cylinder 24. This pressure variation is attenuated by the electromagnetically operated variable attenuation valve 38 and absorbed by the accumulator 40, thereby securely preventing the vibration input from the road surface from being transmitted through the hydraulic cylinder 24 to the vehicle body side member 16. This provides a high riding quality or occupant comfort to the vehicle.

Figure 6:
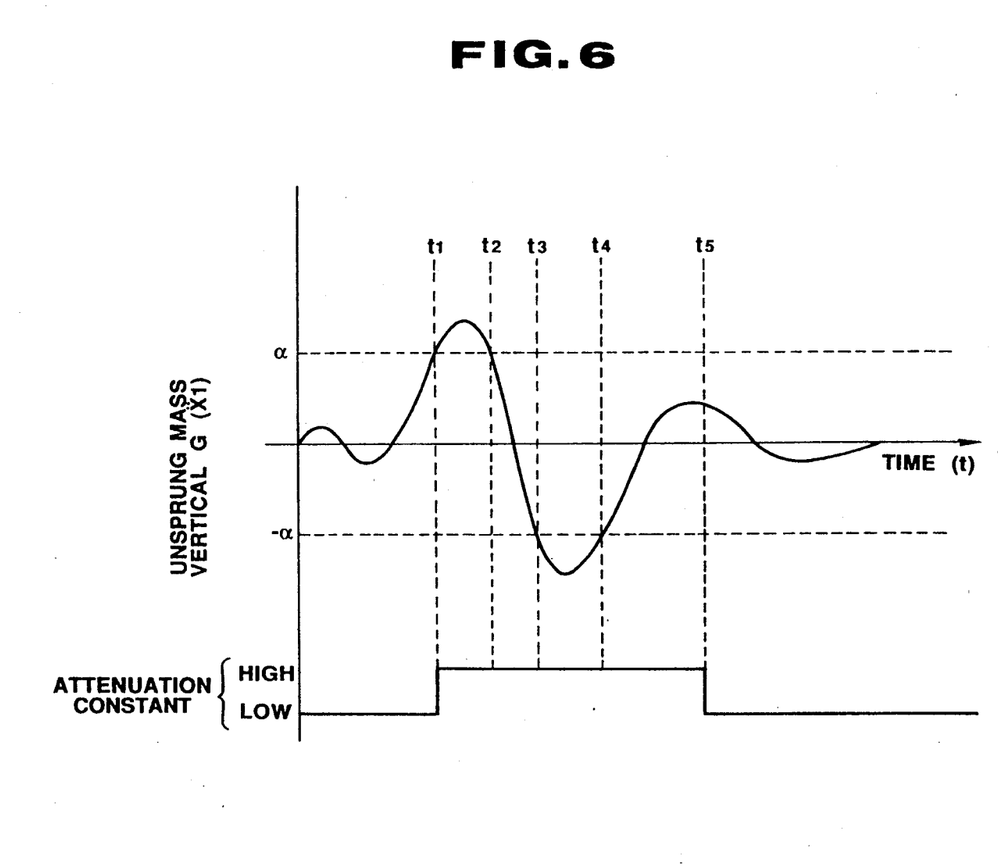
FIG. 6 is a chart showing the relationship between the wave form of a vertical acceleration an unsprung mass and an attenuation constant of the attenuation valve of FIG. 5B.

If the vehicle cruising condition is changed from that on the flat and good road to that on a rough and bad road having a relatively large unevenness, when the vertical acceleration detection value $\ddot{X}1$ of the unsprung mass vertical acceleration sensor 35 exceeds the threshold value $+\alpha$ at a time point t1 as shown in FIG. 6, the process of the damping force control in FIG. 4 is executed as follows:

The process goes from the step S12 to the step S18 at which the timer is set to start its clocking operation. Then, the process goes to the step S19 at which the flag is set at "1" and thereafter goes to the step S17 at which the control signal CS at the logical signal "1" is output to the electromagnetically operated variable attenuation valve 38, so that the attenuation valve 38 is changed into its state of the high attenuation constant. As a result, the electromagnetically operated variable attenuation valve 38 develops a large vibration attenuation or damping force against the pressure change generated in the pressure chamber L of the hydraulic cylinder owing to the vibration input from the road surface, the pressure change being finally absorbed by the accumulator 40.

Thereafter, during a time period reaching a time point t2, the vertical acceleration detection value $\ddot{X}1$ of the unsprung mass vertical acceleration sensor 35 is in excess of the threshold value $+\alpha$, and therefore the process always goes to the step S18 at which the timer is reset when the process of the damping force control in FIG. 4 starts.

Subsequently, when a time point t2 is reached, the unsprung mass acceleration detection value $\ddot{X}1$ becomes lower than the threshold value $+\alpha$, and therefore the process goes from the step S12 to the step S13 at which the flag is set at "1". Accordingly, the process goes to the step S15, in which since the timer has been set immediately before, the flow goes to the step 17 so that the electromagnetically operated variable attenuation valve 38 is maintained at the state of the high attenuation constant as shown in FIG. 6.

Thereafter, when the unsprung mass vertical acceleration detection value $\ddot{X}1$ becomes lower than the threshold value $-\alpha$ at a time point t3 which is before the time-up operation of the timer, the flow goes from the step S12 to the step S18 to reset the timer, at the time point at which the process of the damping force control in FIG. 4 is executed. As a result, the electromagnetically operated variable attenuation valve 38 maintains the state of the high attenuation constant.

Subsequently, when the unsprung mass vertical acceleration detection value $\ddot{X}1$ exceeds the threshold value $-\alpha$ at a time point t4, the process goes from step S12 to step S13, upon which the timer makes no time-up operation and therefore the process goes to the step S17 so that the electromagnetically operated variable attenuation valve 38 is maintained at the state of the high attenuation constant.

Thereafter, the unsprung mass vertical acceleration detection value $\ddot{X}1$ falls within the range between the threshold valves $-\alpha$, $+\alpha$ as illustrated in FIG. 6, and therefore the timer continues its clocking operation. When the timer makes its time-up operation at a time point t5, the process goes from the S15 to the step S16 at which the flag is reset at "0", at the time point at which the process of the damping force control in FIG. 4 is executed. The process then goes to the step 14 at which the control signal CS at the logical value "0" is output to the electromagnetically operated variable attenuation valve 38, so that the attenuation valve 38 is changed into the state of the low attenuation constant.

Thus, once the unsprung mass acceleration detection value X1 is outside the range between the threshold values $+\alpha$, $-\alpha$, the timer is set so that the electromagnetically operated variable attenuation valve 38 is maintained at the state of the high attenuation constant until the timer makes its time-up operation, thereby securely preventing a so-called hunting in which changes in attenuation constant occur frequently. This improves the riding quality or occupant comfort of the vehicle.

When the vehicle cruises on a rough road and comes into a condition in which a sprung mass vertical acceleration is developed in the vehicle body side member 16, the positive or negative vertical acceleration detection value $\ddot{X}2$ is output from the sprung mass vertical acceleration sensor 34 in accordance with the vertical acceleration. Accordingly, the vertical velocity detection value $\dot{X}2$ obtained by integrating the acceleration detection value becomes positive or negative. At this time, when a downward acceleration relative to the vehicle body is developed, the vertical acceleration detection value $\ddot{X}2$ becomes negative and therefore the vertical velocity detection value $\dot{X}2$ becomes negative. As a result, the pressure command value P calculated at the step S4 in the process of FIG. 3 increases over the neutral pressure command value Pn. This increases the extending force of the hydraulic cylinder 24 (i.e., all the hydraulic cylinders 24 respectively for the four road wheels 12), thereby preventing the vehicle body from making its bound condition in which the vehicle body descends downward. In contrast, when an upward acceleration relative to the vehicle body is developed, the vertical acceleration detection value $\ddot{X}2$ becomes positive, so that the pressure command value P becomes lower than the neutral pressure command value Pn. Accordingly, the extending force of the hydraulic cylinder 24 is decreased to thereby suppress occurrence of a rebound condition in which the vehicle body ascends upwardly. Hence, the vehicle body can be maintained at a generally flat condition upon exhibition of a so-called anti-bounce effect.

Similarly, in case that the vehicle makes its temporary bottoming or descending upon passing a difference in road level, unevenness and the like, so that a vertical acceleration is developed in the vehicle body side member 16 even under the flat road cruising condition, the pressure command value P is calculated to control the attitude of the vehicle body so as to maintain the vehicle body in its generally flat or balanced state. Additionally, if the wheel side member 14 is supplied with such vibration that unsprung mass vertical acceleration detection value $\ddot{X}1$ exceeds the threshold values $+\alpha$, $-\alpha$, the electromagnetically controlled variable attenuation valve 38 is changed into the state of the high attenuation constant, thereby suppressing the tramp of the wheel side member 14.

Thus, according to the above-mentioned embodiment, the operational state of the electromagnetically operated variable attenuation valve 38 is changed at two stages, to take on the high and low attenuation constants. Accordingly, if the vertical acceleration of the unsprung mass or members is relatively small, the electromagnetically operated variable attenuation valve 38 is adapted to take on the low attenuation constant, thereby ensuring a good riding quality or comfortableness of the vehicle. In case that the vertical acceleration of unsprung mass (members) is relatively large, the electromagnetically operated variable attenuation valve 38 is adapted to take the high attenuation constant, thereby exhibiting a high suppression effect to vibration applied to the unsprung mass (members).

Figure 7:
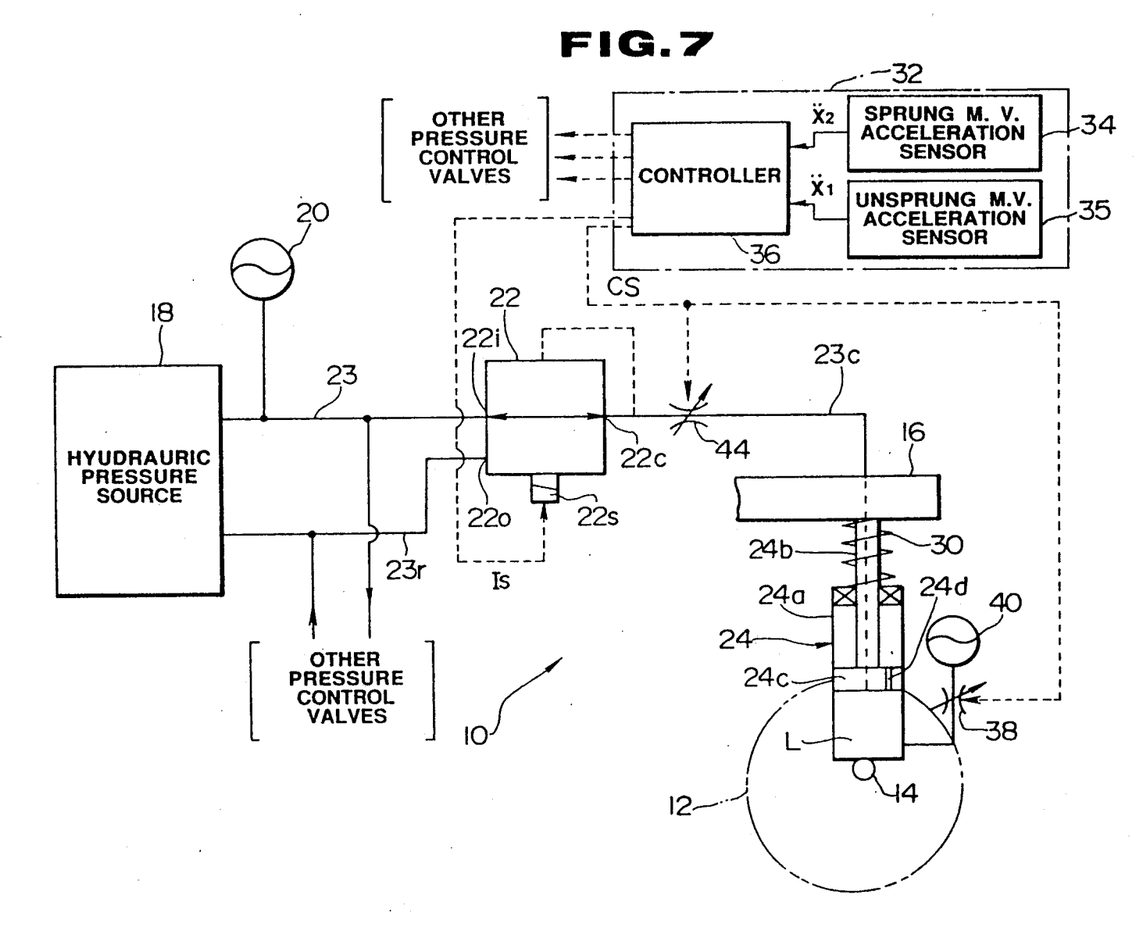
FIG. 7 is a schematic illustration similar to FIG. 1, showing a modified example of the embodiment of the active suspension system of FIG. 1.

While only the magnetically operated variable attenuation valve 38 has been shown and described as being of the variable type wherein the attenuation constant is variable in the above-discussed embodiment, it will be understood that the fixed flow restrictor 42 disposed in the fluid pipe 23c between the pressure control valve 22 and the hydraulic cylinder 24 may be replaced with an electromagnetically operated variable attenuation valve 44 which is arranged in a manner similar to the attenuation valve 38 and is adapted to be changeable in its attenuation constant in accordance with the control signal CS or with the unsprung mass vertical acceleration detection value $\ddot{X}1$ as shown in FIG. 7. In this instance, the vibration suppression effect of the unsprung mass (members) can be further improved.

Figure 8:
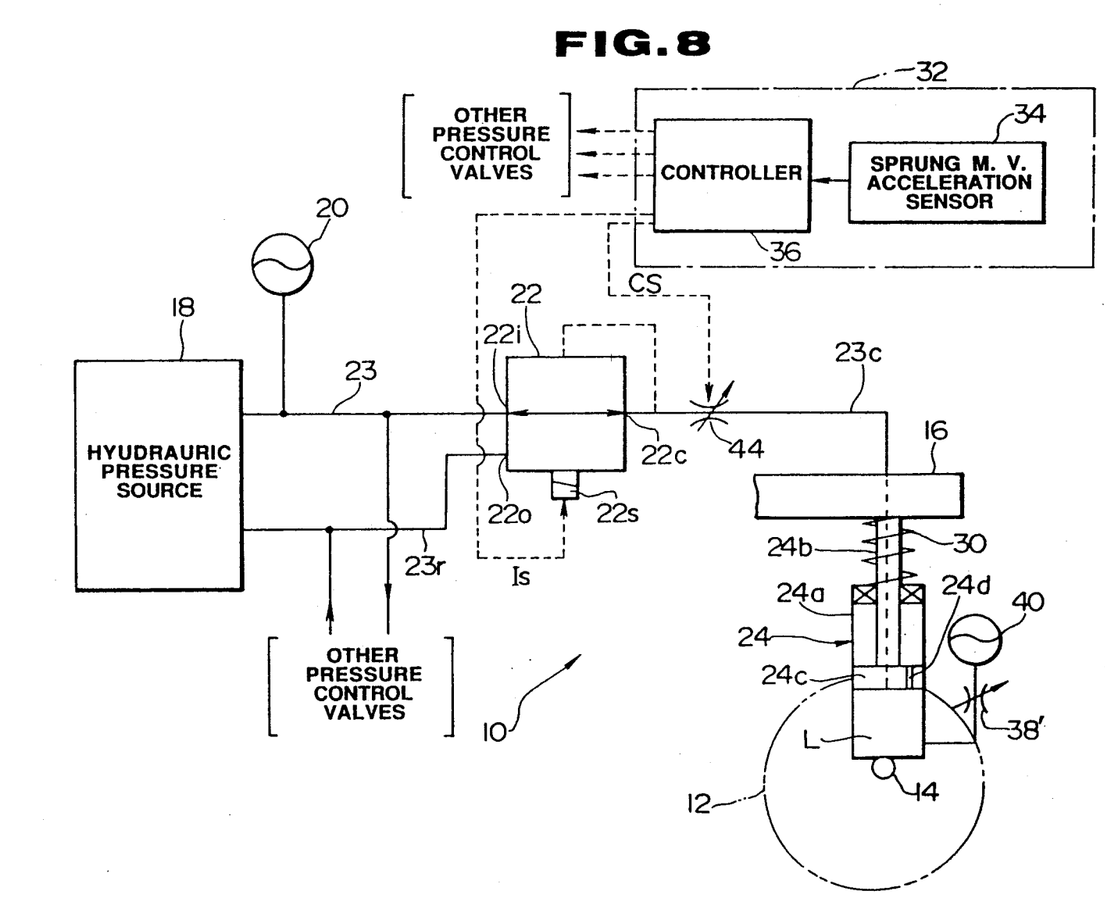
FIG. 8 is a schematic illustration similar to FIG. 1, showing another embodiment of the positive suspension system according to the present invention.
Figure 9:
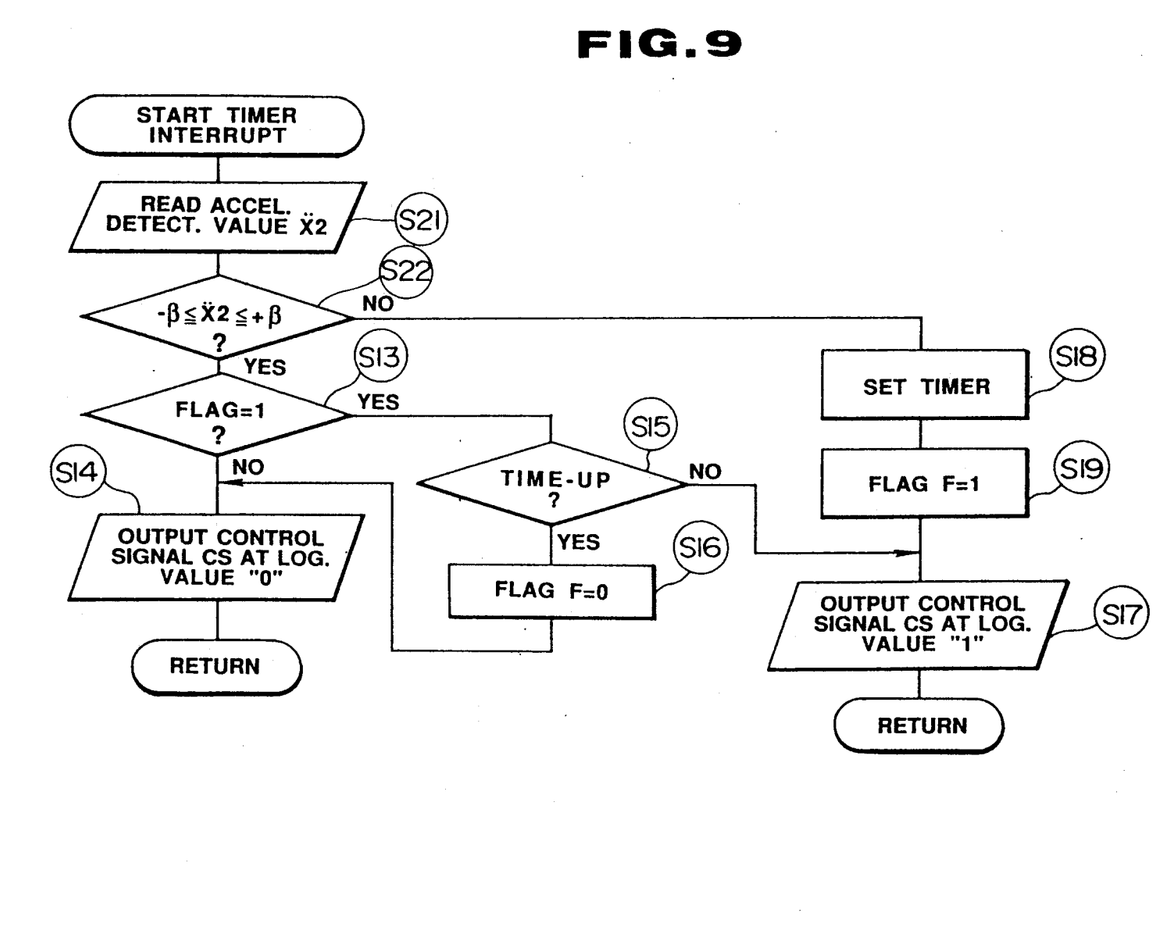
FIG. 9 is a flowchart for the process of an exemplary damping force control, executed by a controller used in the system of FIG. 8.
Figure 10:
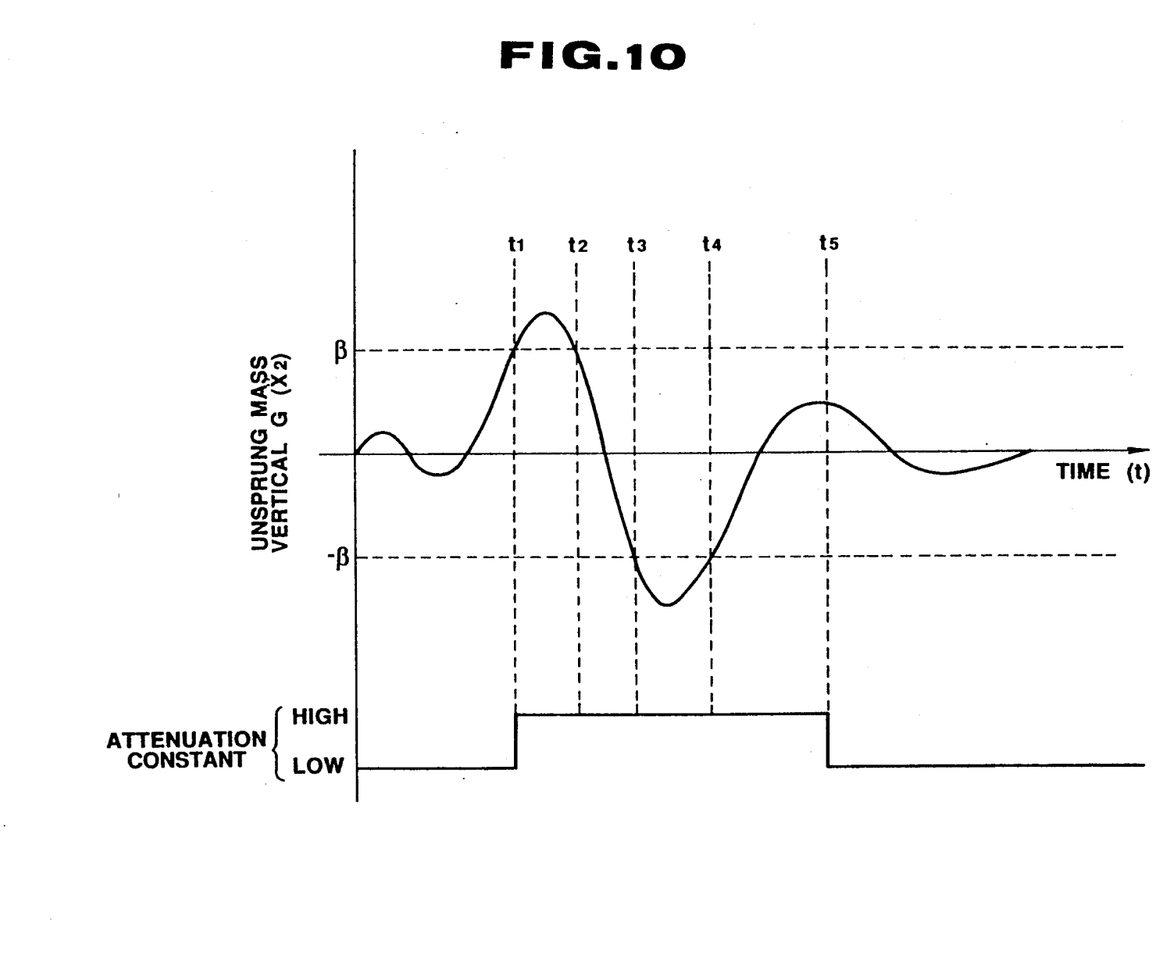
FIG. 10 is a flowchart showing the relationship between the wave form of a vertical acceleration of a sprung mass and an attenuation constant of an electromagnetically operated attenuation valve used in the embodiment of FIG. 8.

FIGS. 8 to 10 illustrate another embodiment of the active suspension system 10 of the present invention that is similar to the embodiment of FIG. 1. In this embodiment, the attenuation constant of an attenuation force changing mechanism, or an electromagnetically operated attenuation variable valve 44 in the pipe 23 between the pressure control valve 22 and the hydraulic cylinder 24, is changed in accordance with the value of the sprung mass vertical acceleration applied to the vehicle body side member 16.

More specifically, as shown in FIG. 8, this embodiment is arranged as follows, as compared with the embodiment of FIG. 1: The unsprung vertical acceleration sensor 35 is omitted. A fixed flow restrictor 38' (like the fixed flow restrictor 42) is used in place of the electromagnetically operated variable attenuation valve 38. Additionally, electromagnetically operated variable attenuation valve 44 having the same construction as that 38 in FIG. 1 is disposed in the pipe 23 connecting the controlled pressure port 22c of the pressure control valve 22 and the pressure chamber L of the hydraulic cylinder 24.

Furthermore, the controller 36 is adapted to execute the process of a damping force control in FIG. 9 in place of that in FIG. 4 in the embodiment of FIG. 1. Also in the flowchart of FIG. 9, like step numbers designate like steps in the flowchart of FIG. 4. More specifically, the process of the damping force control in FIG. 9 is similar to that in FIG. 4 for the following exception: At a step S21, the vertical acceleration detection value $\ddot{X}2$ of the sprung mass vertical acceleration sensor 34 is read. Subsequently, at a step S22, a judgment is made as to whether the vertical acceleration detection value $\ddot{X}2$ is within a range between predetermined threshold values $+\beta$, $-\beta$. If $-\beta \leq \ddot{X}2 \leq +\beta$, the process goes to the step S13; and if $\ddot{X}2 < -\beta$ or $\ddot{X}2 > +\beta$, the process goes to the step 18.

The active suspension system of this embodiment operates as follows:

In a state where the vehicle is cruising at a steady speed on a flat and good road, no vertical acceleration is developed in the vehicle body side member 16, and therefore the sprung mass vertical acceleration detection value $\ddot{X}2$ output from the sprung mass vertical acceleration sensor 34 is zero. When the process of the vehicle body attitude control of FIG. 3 is executed, the pressure command value P is set at the neutral pressure command value Pn, so that the vehicle body is maintained at the flat or horizontal state. Additionally, when the process of damping force control of FIG. 9 is executed, the flow goes from the step S22 to the step S13. Then the flag F is "0", and accordingly the process goes to the step S14 so that the electromagnetically operated variable attenuation valve 44 is maintained at the state of the low attenuation constant thereby obtaining a high riding quality or comfortableness of the vehicle.

If the vehicle cruising condition shifts from that on the flat and good road, to that on a rough road so that a vertical acceleration is developed in the vehicle body side member 16, the bounce suppression effect is exhibited as same in the embodiment of FIG. 1 when the process of vehicle body attitude control of FIG. 3 is executed. When the process of damping force control of FIG. 9 is executed, the electromagnetically operated variable attenuation valve 44 is maintained at the state of the low attenuation constant, to thereby obtain a high riding quality or comfort in case the sprung mass acceleration detection value $\ddot{X}2$ is within the range of the threshold value $+\beta$ and $-\beta$. However, in case the sprung acceleration detection value $\ddot{X}2$ is outside the range between the threshold values $+\beta$ and $-\beta$ as shown in FIG. 10, the flow goes from the step S22 to the step S18 at which the timer is set. Then, at the step S19, the flag is set at "1", and the process goes to the step S17 thereby changing the electromagnetically operated variable attenuation valve 44 into the state of the high attenuation constant as shown in FIG. 10. As a result, the electromagnetically operated variable attenuation valve 44 can exhibit a greater attenuation or damping effect against a pressure change within a relatively low frequency range corresponding to the sprung mass resonance frequency region, in the pressure chamber L of the hydraulic cylinder 24. This can prevent the sprung mass from floating upwardly.

While both the vehicle body attitude control (bounce suppression control) and the damping force control have been shown and described as being accomplished by the controller 36 in the above-discussed embodiments, it will be understood that they may be accomplished respectively by separate controllers. Additionally, the controller is not limited to one including a microcomputer and therefore may be constituted by incorporating various electronic circuits such as a comparator circuit, a computing circuit and the like.

Although each of the electromagnetically operated variable attenuation valve 38, 44 has been shown and described as being arranged as changing its attenuation constant at high and low (two) stages in the above-discussed embodiments, it will be appreciated that it may be arranged such that the attenuation constant is changeable in a multi-staged manner or continuously in accordance with the unsprung mass vertical acceleration detection value $\ddot{X}1$ or the sprung mass vertical acceleration detection value $\ddot{X}2$.

While the pressure control valve 22 has been shown and described as being used to control the hydraulic cylinder 24 upon changing the pressure to be supplied to the hydraulic cylinder in the above-discussed embodiments, it will be understood that a servo flow control valve may be used to control the hydraulic cylinder upon changing the flow amount of the fluid to be supplied to the hydraulic cylinder.

Additionally, although only the hydraulic cylinder has been shown and described as fluid pressure operated cylinder in the above-discussed embodiments, it will be appreciated that the hydraulic cylinder may be replaceable with other fluid pressure operated cylinders such as a pneumatic cylinder.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An active suspension system for a vehicle having a vehicle body side member and a road wheel side member, said suspension system, comprising:
   a fluid-operated cylinder disposed between and connecting the vehicle body side member and the road wheel side member;
   a control valve, for controlling an operating fluid to be supplied to said fluid-operated cylinder in accordance with a first command value;
   means for detecting a change in attitude of the body of the vehicle and generating an attitude change detection value representative of said attitude change;

means for calculating said first command value in accordance with said attitude change detection value;

means for detecting a vertical acceleration of a movable member functionally connected to said fluid-operated cylinder and for generating a vertical acceleration detection value representative of said vertical acceleration, said movable member being vertically movable during cruising of the vehicle;

means for changing a damping force of said fluid-operated cylinder in accordance with a second command value; and means for calculating said second command value in accordance with said vertical acceleration detection value.

2. The active suspension system as claimed in claim 1, wherein:

said vertical acceleration detecting means includes means for detecting a vertical acceleration of an unsprung mass of the vehicle.

3. The active suspension system as claimed in claim 2, wherein:

said vertical acceleration detecting means includes means for detecting a vertical acceleration of a road wheel of the vehicle.

4. The active suspension system as claimed in claim 2, wherein:

said damping force changing means includes at least one variable vibration attenuation valve having an attenuation constant that is variable in accordance with said second command value.

5. The active suspension system as claimed in claim 4, wherein:

said at least one variable attenuation valve includes a first variable attenuation valve fluidly connected between said fluid-operated cylinder and a fluid accumulator, and a second variable attenuation valve fluidly disposed between said control valve and said fluid-operated cylinder.

6. The active suspension system as claimed in claim 1, wherein:

said vertical acceleration detecting means includes means for detecting a vertical acceleration of a spring mass of the vehicle.

7. The active suspension system as claimed in claim 6, wherein:

said vertical acceleration detecting means includes means for detecting a vertical acceleration of the vehicle body.

8. The active suspension system as claimed in claim 6, wherein:

said damping force changing means includes a variable vibration attenuation valve having an attenuation constant that is variable in accordance with said second command value, said variable vibration attenuation valve being fluidly disposed between said fluid-operated cylinder and said control valve.

9. The active suspension system as claimed in claim 1, wherein:

said fluid-operated cylinder is a hydraulic cylinder.

10. The active suspension system as claimed in claim 9, wherein:

said control valve is adapted to control a hydraulic pressure to be supplied to said hydraulic cylinder.

* * * * *